United States Patent
Shin et al.

(10) Patent No.: US 7,363,049 B2
(45) Date of Patent: Apr. 22, 2008

(54) PATHLOSS AIDED CLOSED LOOP POWER CONTROL

(75) Inventors: Sung-Hyuk Shin, Fort Lee, NJ (US); Fatih Ozluturk, Port Washington, NY (US); Ariela Zeira, Huntington, NY (US); Chang-Soo Koo, East Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 701 days.

(21) Appl. No.: 10/266,882

(22) Filed: Oct. 7, 2002

(65) Prior Publication Data
US 2003/0068984 A1 Apr. 10, 2003

Related U.S. Application Data

(60) Provisional application No. 60/328,327, filed on Oct. 9, 2001.

(51) Int. Cl.
*H04B 7/00* (2006.01)
(52) U.S. Cl. .................. 455/522; 455/69; 370/318
(58) Field of Classification Search ................ 455/522, 455/69, 68; 370/318
See application file for complete search history.

(56) References Cited

U.S. PATENT DOCUMENTS

| | | | |
|---|---|---|---|
| 6,072,784 A | 6/2000 | Agrawal et al. | |
| 6,144,861 A * | 11/2000 | Sundelin et al. | 455/522 |
| 6,377,813 B1 | 4/2002 | Kansakoski et al. | |
| 6,381,230 B1 | 4/2002 | Wheatley, III et al. | |
| 6,577,668 B2 * | 6/2003 | Zeira et al. | 375/130 |
| 6,600,772 B1 * | 7/2003 | Zeira et al. | 375/130 |
| 6,765,883 B1 * | 7/2004 | van Heeswyk | 370/318 |
| 6,956,889 B2 * | 10/2005 | Zeira et al. | 375/130 |
| 6,993,063 B2 * | 1/2006 | Zeira et al. | 375/130 |
| 2002/0168993 A1 * | 11/2002 | Choi et al. | 455/522 |
| 2004/0141483 A1 * | 7/2004 | Zeira et al. | 370/335 |

FOREIGN PATENT DOCUMENTS

| | | |
|---|---|---|
| KR | 1994-12914 | 6/1994 |
| KR | 199412914 | 6/1994 |
| KR | 200130947 | 4/2001 |

* cited by examiner

*Primary Examiner*—Matthew Anderson
*Assistant Examiner*—Angelica M. Perez
(74) *Attorney, Agent, or Firm*—Volpe and Koenig, P.C.

(57) ABSTRACT

A transmitting station receives a transmit power command and a reference signal. The transmit power command indicates an increase or decrease in transmission power for the transmitting station. A received power level of the reference signal is measured and the measured reference signal received power level is compared to a transmit power level of the reference signal to produce a pathloss estimate of the reference signal. A size of a change in transmit power level is determined using the pathloss estimate. A transmission power level of the transmitting station is adjusted in response to the transmit power command in an amount of the determined change in size. A communication is transmitted at the adjusted transmission power level.

21 Claims, 2 Drawing Sheets

PATHLOSS AIDED CLOSED LOOP POWER CONTROL

This application claims priority to U.S. Provisional Patent Application No. 60/328,327, filed Oct. 9, 2001.

BACKGROUND

This invention generally relates to spread spectrum communication systems. More particularly, the present invention relates to controlling transmission power levels in such systems.

In many spread spectrum communication systems, multiple user communications are sent over a shared frequency spectrum. In code division multiple access (CDMA) communication systems, the multiple communications are send using different codes to distinguish them. In time division duplex/code division multiple access (TDD/CDMA) and time division synchronous CDMA (TD-SCDMA) communication systems, the spectrum is also time divided to better utilize the spectrum.

Since multiple communications are sent in the same spectrum, the communications may interfere with each other. To reduce the interference that the communications induce on one another, adaptive power control is used. The purpose of adaptive power control is to transmit each communication at a minimum power level to achieve a specified reception quality, such as a target signal to interference ratio (SIR).

One scheme to implement adaptive power control is closed loop power control. In closed loop power control, a transmitter transmits a communication at a certain power level. A target receiver receives the communication and measures the SIR of the received signal. The measured SIR is compared to a target SIR. If the measured SIR is larger than the target SIR, a power control command indicating that the transmitter should decrease its transmission power is sent. If the measured SIR is less than or equal to the target SIR, a power command indicating that the transmitter should increase its power level is sent. The power control command is, typically, a single bit indicating either an increase or decrease in power level. The commands are typically sent at a frequency of 100 to 200 commands per second in TDD/CDMA and TD-SCDMA.

The transmitter receives the power command and changes its transmission power level in response to the power command by a fixed amount, such as by increasing or decreasing the transmission power level by 1 dB. When channel conditions are highly dynamic, closed loop power control may not be able to compensate fast enough to compensate for the channel conditions. As a result, received signal quality may drop below acceptable levels.

Accordingly, it is desirable to have other approaches to power control.

SUMMARY

A transmitting station receives a transmit power command and a reference signal. The transmit power command indicates an increase or decrease in transmission power for the transmitting station. A received power level of the reference signal is measured and the measured reference signal received power level is compared to a transmit power level of the reference signal to produce a pathloss estimate of the reference signal. A size of a change in transmit power level is determined using the pathloss estimate. A transmission power level of the transmitting station is adjusted in response to the transmit power command in an amount of the determined change in size. A communication is transmitted at the adjusted transmission power level.

BRIEF DESCRIPTION OF THE DRAWING(S)

DETAILED DESCRIPTION OF THE PREFERRED EMBODIMENT(S)

Although pathloss aided closed loop power control is explained with the preferred TDD/CDMA and TD-SCDMA communication systems, it can be applied to other communication systems experiencing channel reciprocity between the uplink and downlink.

Figure 1:
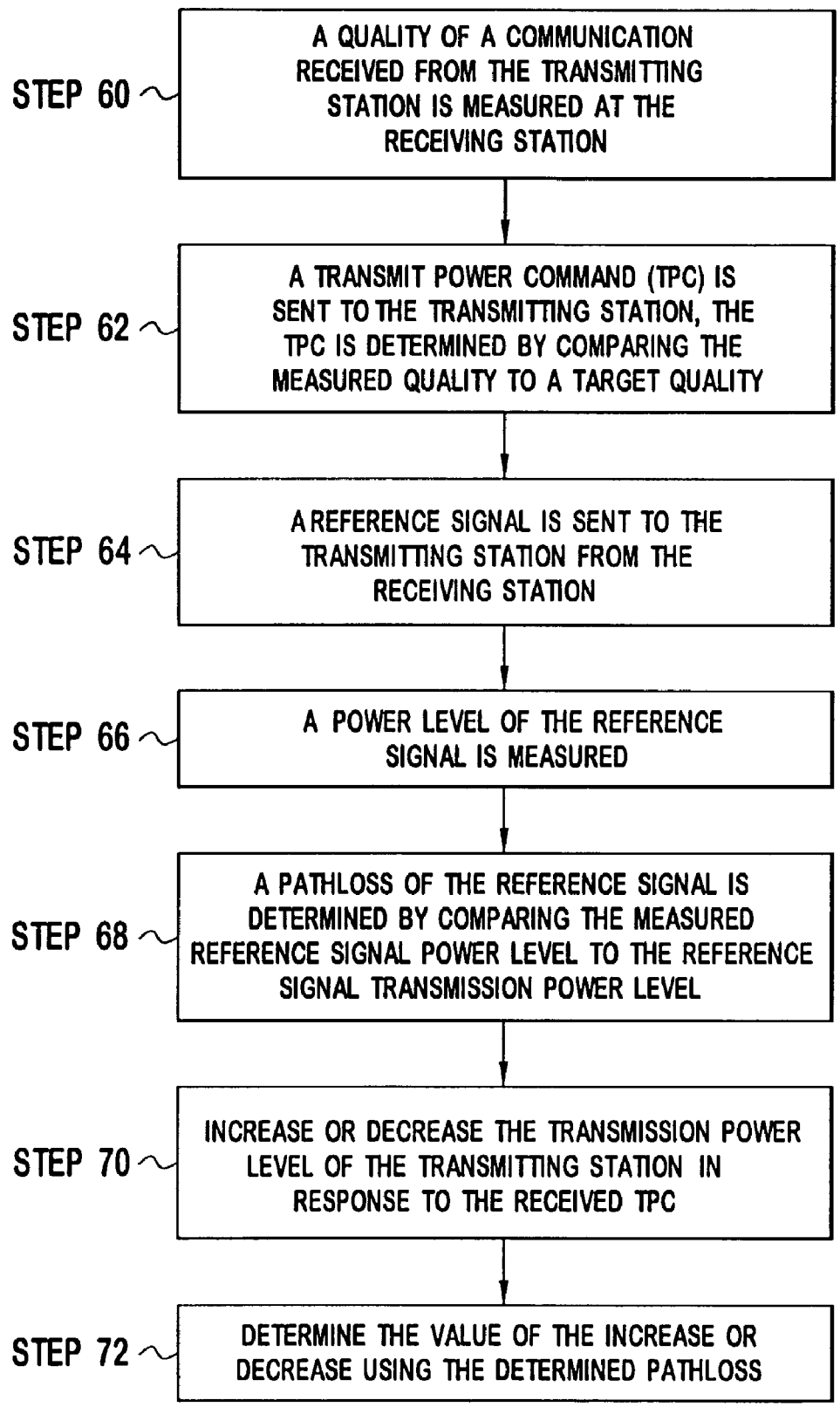
FIG. 1 is a flow chart of an embodiment of pathloss aided closed loop power control.
Figure 2:
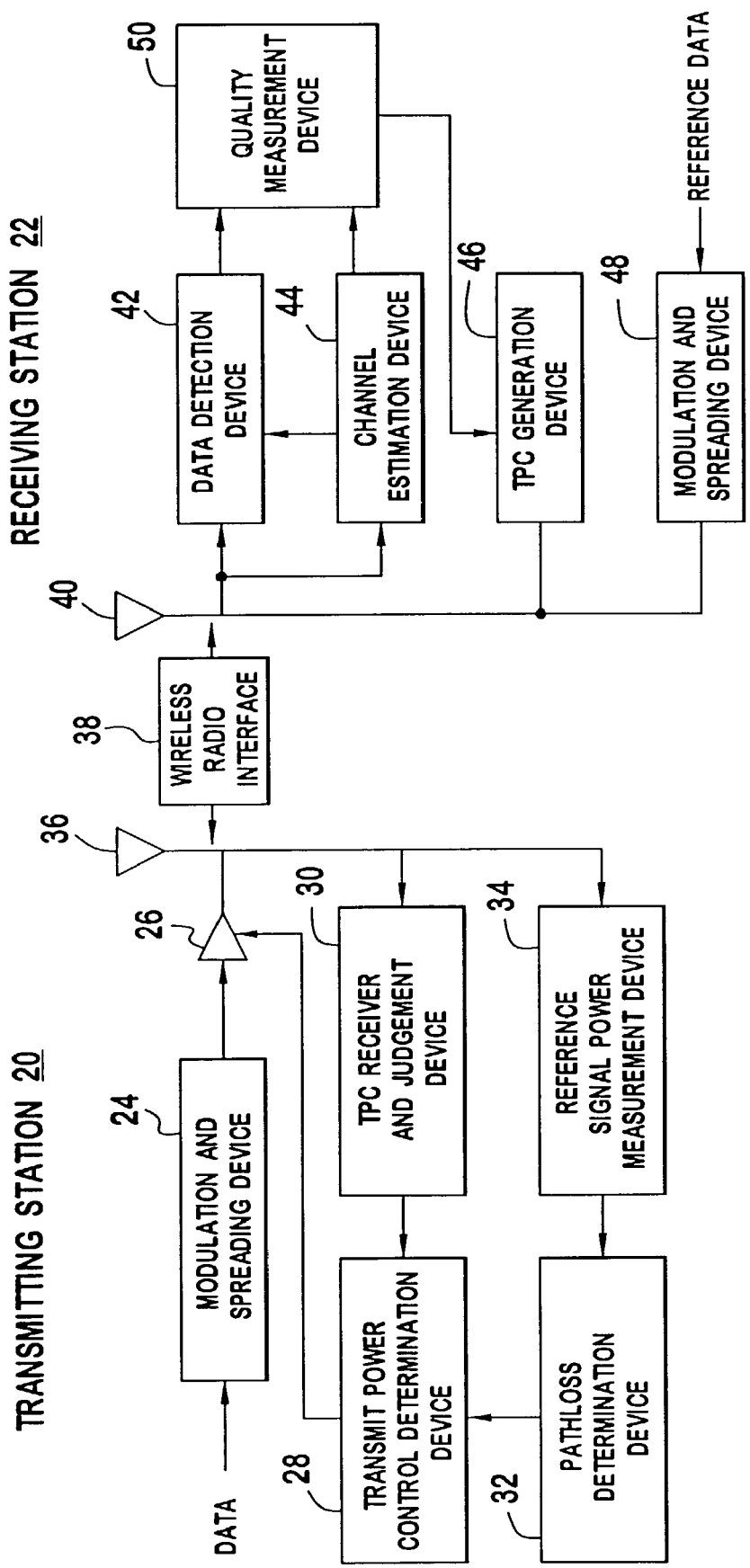
FIG. 2 is a simplified block diagram of a transmitting and receiving station using pathloss aided closed loop power control.

A preferred embodiment of pathloss aided closed loop power control is explained using the flow chart of FIG. 1 and the components of two simplified communication stations of FIG. 2. For the following discussion, the communication station having its transmission power level controlled is referred to as the transmitting station 20 and the communication station receiving the power controlled communications is referred to as the receiving station 22. Since pathloss aided closed loop power control can be used for uplink, downlink or both types of communications, the transmitting station 20 may be a base station, a user equipment or both.

At the transmitting station 20, data to be transmitted to the receiving station is modulated and spread to produce a spread spectrum radio frequency (RF) signal by a modulation and spreading device 24. An amplifier 26 is used to control the power level of the RF signal. The RF signal is radiated by an antenna 36 or antenna array through a wireless radio interface 38 to the receiving station 22.

The RF signal is received by an antenna 40 or antenna array of the receiving station 22. The impulse response of the received signal is estimated by a channel estimation device 44. In a TDD/CDMA or TD-SCDMA communication system, the channel estimation is performed using known training sequences in a midamble portion of a communication burst. Using the impulse responses, the data detection device 42 recovers the transmitted data from the received RF signal. Using information from both the data detection device 42 and the channel estimation device 44, a quality of the received RF signal, such as a SIR, is measured by a quality measurement device 50, (step 60). A transmit power command (TPC) generation device 46 compares the measured quality to a target quality. If the measured quality is greater than the target, a decrease command is generated. If the measured quality is less than or equal to the target, an increase command is generated. Although other commands may be used, the preferred command is a single bit with a +1 indicating an increase in power level and a −1 indicating a decrease in power level. The TPC is sent to the transmitting station 20, (step 62).

Reference data is modulated and spread by a modulation and spreading device 48 to produce a reference RF signal. The reference RF signal is radiated by the antenna 40 or antenna array to the transmitting station 20 through the wireless radio interface 38, (step 64). For uplink power control for a third generation partnership project TDD/CDMA system or TD-SCDMA system, the preferred reference channel is the primary common control physical channel (P-CCPCH).

The transmitting station 20 receives the reference signal using its antenna 36 or antenna array. A reference signal power measurement device 34 measures the power level of the received reference signal, (step 66). Using the measured reference signal power, a pathloss determination device 32 determines the pathloss for the reference signal, (step 68). The transmission power level of the reference signal may be known a priori by the transmitting station 20 or signaled to the transmitting station 20, such as by using a broadcast channel (BCH). The pathloss is determined by subtracting the received power level from the transmitted power level.

The TPC is received by a TPC receiver and judgement device 30 and the value of the TPC is determined. Using the determined value for the TPC, the transmission power level is either increased or decreased by the transmit power control determination device 28, (step 70). The value of the increase or decrease is based on a change in the estimated pathloss over time, (step 72). A gain of the amplifier 26 is adjusted so that the transmitted RF signal is at the adjusted power level. If the change in pathloss is large, indicating a large change in channel conditions, the change in transmission power level is large. Conversely, if the change in pathloss is small, indicating a small or no change in channel conditions, the change in transmission power level is small. Using large changes in transmission power allows for quick compensation for rapidly changing channel conditions, such as fast fading channels. Small transmission power changes are used for slowly varying channel conditions.

One approach to determine the transmission power level, $P(k)$ for a $k^{th}$ power command is per Equation 1.

$$P(k) = P(k-1) + TPC\_bit * step\_size(\Delta L) \quad \text{Equation 1}$$

$P(k-1)$ is the determined power level for the $(k-1)^{th}$ power command. TPC_bit is the value of the TPC, preferably +1 or −1. $\Delta L$ is the change in pathloss estimate from the $k^{th}$ power command to the $(k-1)^{th}$ power command and step_size($\Delta L$) is a step size value determined as a function of $\Delta L$.

One equation for determining $\Delta L$ is Equation 2.

$$\Delta L = |L(k) - L(k-1)| \quad \text{Equation 2}$$

$L(k)$ is the most recent pathloss estimate prior to the $k^{th}$ power command and $L(k-1)$ was the most recent pathloss estimate prior to the $(k-1)^{th}$ power command.

Alternately, to compensate for inaccuracies in pathloss estimate due to a timelag between the time of the pathloss estimate and the time of the power controlled transmission, the pathloss estimates, $L(k)$ and $L(k-1)$, may be weighted pathloss estimates. The estimated pathloss and a longterm pathloss estimate, $L_0$, are weighted based on a time delay between the time of the next transmission and the time of the pathloss estimate. Equation 3 is an equation for such a weighting.

$$L(k) = \alpha L + (1-\alpha) L_0 \quad \text{Equation 3}$$

L is the most recent pathloss estimate and $\alpha$ is a weighting factor. For time slot based communication systems, such as TDD/CDMA and TD-SCDMA, $\alpha$ is based on the number of time slots between the time slot that the pathloss was estimated and the time slot of the next transmission after receiving the $k^{th}$ power command, $\Delta TS$, such as per Equation 4.

$$\alpha = \max\left\{\left(1 - \frac{(\Delta TS - 1)}{TS_{MAX}}\right), 0\right\} \quad \text{Equation 4}$$

$TS_{MAX}$ is the maximum value of $\Delta TS$, which is equal to the number of timeslots between two consecutive pathloss estimates. To illustrate, if $TS_{MAX}$ is seven and the most recent pathloss estimate was six time slots prior to the next transmission, $\alpha$ of Equation 4, is $1/7$. For non-time slot based systems, $\alpha$ is determined by a time period between the measuring of the pathloss estimate and the subsequent transmission.

Using the change in pathloss, $\Delta L$, a step size for the change in power level is determined. One approach to determine the step size uses a threshold test. If the absolute value of the change in pathloss is between certain thresholds, a specified step size is selected. To illustrate using three step sizes, step_size1, step_size2 and step_size3, step_size1 is used if $\Delta L$ is less than a first threshold, T1. step_size2 is if $\Delta L$ is equal to T1 or between T1 and a second threshold T2. step_size3 is used if $\Delta L$ is greater than or equal to T2. Alternately, a look up table may be used associating various $\Delta L$s with step sizes.

What is claimed is:

1. A method for controlling transmission power levels of a transmitter station, the method comprising:
   receiving at the transmitting station a transmit power command and a reference signal, the transmit power command indicating an increase or decrease in transmission power for the transmitting station;
   measuring a received power level of the reference signal and comparing the measured reference signal received power level to a transmit power level of the reference signal to produce a pathloss estimate of the reference signal;
   determining a size of a change in transmit power level using the produced pathloss estimate, wherein the determining a size of a change in transmit power level is determined by comparing a prior pathloss estimate to the produced pathloss estimate, and wherein the produced and prior pathloss estimates are weighted pathloss estimates and the weighted pathloss estimates are determined by multiplying a measured pathloss estimate by a first factor ($\alpha$) and adding the weighted pathloss estimate to a longterm pathloss estimate multiplied by ($1-\alpha$);
   adjusting a transmission power level of the transmitting station by increasing or decreasing the transmit power level in response to the transmit power command in an amount of the determined change in size; and
   transmitting a communication at the adjusted transmission power level.

2. The method of claim 1 wherein the reference signal and the transmitted communication are transmitted in reciprocal channels.

3. The method of claim 1 wherein the comparing is by taking a difference between the prior and produced pathloss.

4. The method of claim 3 wherein the size of the change in transmit power is determined by comparing the pathloss difference to thresholds and selecting the size based on between which thresholds the pathloss difference falls.

5. The method of claim 1 wherein the time period is a number of timeslots between the measuring of the measured pathloss estimate and a time slot of transmission of the communication.

6. The method of claim 5 for use in a time division synchronous code division multiple access communication system.

7. The method of claim 5 for use in a time division duplex/code division multiple access communication system.

8. A user equipment comprising:
a transmit power command receiver and judgment device for receiving a transmit power command and determining a value of the received transmit power command, the transmit power command indicating an increase or decrease in transmission power;
an antenna for receiving a reference signal and radiating a communication;
a reference signal power measurement device for measuring a received power level of the reference signal;
a pathloss determination device for comparing the measured reference signal received power level to a transmit power level of the reference signal to produce a pathloss estimate of the reference signal;
a transmit power control determination device for determining a size of a change in transmit power level using the produced pathloss estimate and for determining an adjustment in a transmission power level by increasing or decreasing the transmit power level in response to the transmit power command in an amount of the determined change in size, wherein the determining a size of a change in transmit power level is determined by comparing a prior pathloss estimate to the produced pathloss estimate, and wherein the produced and prior pathloss estimates are weighted pathloss estimates and the weighted pathloss estimates are determined by multiplying a measured pathloss estimate by a first factor ($\alpha$) and adding the weighted pathloss estimate to a longterm pathloss estimate multiplied by (1-$\alpha$);
a modulation and spreading device for producing the communication; and
an amplifier for adjusting a transmission power level of the communication based on the adjustment in transmission power level.

9. The user equipment of claim 8 wherein the reference signal and the transmitted communication are transmitted in reciprocal channels.

10. The user equipment of claim 8 wherein the comparing is by taking a difference between the prior and produced pathloss.

11. The user equipment of claim 10 wherein the size of the change in transmit power is determined by comparing the pathloss difference to thresholds and selecting the size based on between which thresholds the pathloss difference falls.

12. The user equipment of claim 8 wherein the time period is a number of timeslots between the measuring of the measured pathloss estimate and a time slot of transmission of the communication.

13. The user equipment of claim 12 wherein the communication is transmitted in a time division synchronous code division multiple access format.

14. The user equipment of claim 12 wherein the communication is transmitted in a time division duplex/code division multiple access format.

15. A base station comprising:
a transmit power command receiver and judgment device for receiving a transmit power command and determining a value of the received transmit power command, the transmit power command indicating an increase or decrease in transmission power;
an antenna for receiving a reference signal and radiating a communication;
a reference signal power measurement device for measuring a received power level of the reference signal;
a pathloss determination device for comparing the measured reference signal received power level to a transmit power level of the reference signal to produce a pathloss estimate of the reference signal;
a transmit power control determination device for determining a size of a change in transmit power level using the produced pathloss estimate and for determining an adjustment in a transmission power level by increasing or decreasing the transmit power level in response to the transmit power command in an amount of the determined change in size, wherein the determining a size of a change in transmit power level is determined by comparing a prior pathloss estimate to the produced pathloss estimate, and wherein the produced and prior pathloss estimates are weighted pathloss estimates and the weighted pathloss estimates are determined by multiplying a measured pathloss estimate by a first factor ($\alpha$) and adding the weighted pathloss estimate to a longterm pathloss estimate multiplied by (1-$\alpha$);
a modulation and spreading device for producing the communication; and
an amplifier for adjusting a transmission power level of the communication based on the adjustment in transmission power level.

16. The base station of claim 15 wherein the reference signal and the transmitted communication are transmitted in reciprocal channels.

17. The base station of claim 15 wherein the comparing is by taking a difference between the prior and produced pathloss.

18. The base station of claim 17 wherein the size of the change in transmit power is determined by comparing the pathloss difference to thresholds and selecting the size based on between which thresholds the pathloss difference falls.

19. The base station of claim 15 wherein the time period is a number of timeslots between the measuring of the measured pathloss estimate and a time slot of transmission of the communication.

20. The base station of claim 19 wherein the communication is transmitted in a time division synchronous code division multiple access format.

21. The base station of claim 19 wherein the communication is transmitted in a time division duplex/code division multiple access format.

* * * * *